(12) United States Patent
Ishii (10) Patent No.: US 8,441,541 B2
(45) Date of Patent: May 14, 2013

(54) CONTROL APPARATUS AND CONTROL METHOD THEREFOR

(75) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 12/968,682

(22) Filed: Dec. 15, 2010

(65) Prior Publication Data

US 2011/0157386 A1 Jun. 30, 2011

(30) Foreign Application Priority Data

Dec. 28, 2009 (JP) ................................. 2009-298825

(51) Int. Cl.
*H04N 7/00* (2006.01)
*H04N 5/225* (2006.01)

(52) U.S. Cl.
USPC .......................................... 348/218.1; 348/36

(58) Field of Classification Search .............. 348/36–39, 348/218.1

See application file for complete search history.

(56) References Cited

U.S. PATENT DOCUMENTS

| | | | | |
|---|---|---|---|---|
| 5,907,353 A * | 5/1999 | Okauchi | .................... | 348/218.1 |
| 6,639,625 B1 * | 10/2003 | Ishida et al. | ............... | 348/218.1 |
| 6,947,076 B1 * | 9/2005 | Kitaguchi et al. | ......... | 348/218.1 |

FOREIGN PATENT DOCUMENTS

JP 11-295783 A 10/1999

* cited by examiner

*Primary Examiner* — Timothy J Henn
(74) *Attorney, Agent, or Firm* — Fitzpatrick, Cella, Harper & Scinto (57) ABSTRACT

A control apparatus which controls a capturing device so as to obtain a plurality of captured images including an entire region of an object by capturing the object by a plurality of times while changing a capturing direction of the capturing device, the apparatus comprises: a derivation unit configured to derive a corrected capturing range when at least one of lens aberration correction and perspective correction which are based on a position and the capturing direction of the capturing device with respect to the object is applied to a capturing range obtained upon capturing the object by the capturing device; and a determination unit configured to determine a plurality of capturing ranges which cover the entire region of the object so that two corrected capturing ranges corresponding to two adjacent capturing ranges, respectively, overlap each other.

7 Claims, 10 Drawing Sheets

OVERLAPPING REGION

<CAPTURING RANGE>

FIRST CAPTURING RANGE

⬇ LENS ABERRATION CORRECTION

<EFFECTIVE REGION AFTER LENS ABERRATION CORRECTION>

SECOND CAPTURING RANGE — FIRST EFFECTIVE REGION

⬇ PERSPECTIVE CORRECTION

<EFFECTIVE REGION AFTER PROJECTION>

THIRD CAPTURING RANGE — FIRST EFFECTIVE REGION
SECOND EFFECTIVE REGION

CONTROL APPARATUS AND CONTROL METHOD THEREFOR

BACKGROUND OF THE INVENTION

1. Field of the Invention

The present invention relates to an capturing technique to capture an object with an angle of view that is wider than that of the capturing range (angle of view) of an optical system for a capturing device by a plurality of times, thereby obtaining a captured image of the entire object.

2. Description of the Related Art

An electric mount has been conventionally known as a device that is attached between a tripod and a camera and used to rotate the camera through a predetermined angle. The electric mount is employed as an auxiliary capturing instrument to capture, for example, a panoramic image. The electric mount rotates the camera through a predetermined angle, and therefore allows capturing with an accuracy higher than that in capturing while a person pans the camera at an arbitrary angle in his or her hands. As a technique which uses such an electric mount, a technique (for example, Japanese Patent Laid-Open No. 11-295783) to automatically capturing a panoramic image by controlling both the electric mount and the camera is known.

In this manner, to generate one panoramic image from a plurality of captured images obtained by a plurality of times of capturing (divided capturing) using the electric mount, it is necessary to connect the plurality of captured images. Hence, each image is captured to have overlapping regions with adjacent images, is matched in position with the adjacent images, and undergoes a blend process, thereby undergoing a connection process. This position matching is, for example, a process of obtaining the mean square error for each pixel in the overlapping region, and matching the positions of two images so as to minimize this error. The captured image contains an error due to lens aberration (image distortion), and may have large perspective distortion, depending on the capturing position. Hence, in image connection, the position of each image is matched with those of adjacent images after a process of correcting these errors due to lens aberration and perspective distortion. However, the size and shape of the image change upon the lens aberration correction and perspective correction, and the size of the overlapping region, in turn, changes. Conventionally, the amount of image deformation due to these types of correction is treated as an unknown amount, so divided capturing is performed upon setting unnecessarily large overlapping regions in advance to ensure overlapping regions sufficient for image connection.

A system which performs divided capturing of a work of art such as a painting or a folding screen using an electric mount and a digital camera, and connects the captured images, thereby archiving the resultant image as ultrahigh-resolution image data, and a system which prints this image data to obtain a copy of the work of art, are attracting a great deal of attention. In such systems, a work of art is desirably captured with cuts as small as possible in consideration of, for example, its deterioration upon irradiation with, for example, an electronic flash.

Unfortunately, the above-mentioned conventional divided capturing which uses an electric mount wastes some capturing cuts because capturing is performed upon setting unnecessarily large overlapping regions. In contrast, if too small overlapping regions are set, overlapping regions sufficient for an image connection process cannot be ensured due to image deformation upon lens aberration correction and perspective correction, thus making an appropriate image connection process difficult.

SUMMARY OF THE INVENTION

The present invention provides techniques capable of appropriately setting the capturing directions, in which a capturing device performs divided capturing of an object to capture different images, so that the overlapping regions between the captured images each have a size that is necessary and sufficient for their connection.

According to one aspect of the present invention, a control apparatus which controls a capturing device so as to obtain a plurality of captured images including an entire region of an object, which has an angle of view wider than an angle of view of an optical system of the capturing device, by capturing the object by a plurality of times while changing a capturing direction of the capturing device, the apparatus comprises: a derivation unit configured to derive a corrected capturing range when at least one of lens aberration correction and perspective correction which are based on a position and the capturing direction of the capturing device with respect to the object is applied to a capturing range obtained upon capturing the object by the capturing device; and a determination unit configured to determine a plurality of capturing ranges which cover the entire region of the object so that two corrected capturing ranges corresponding to two adjacent capturing ranges, respectively, overlap each other.

According to another aspect of the present invention, a control method of controlling a capturing device so as to obtain a plurality of captured images including an entire region of an object, which has an angle of view wider than an angle of view of an optical system of the capturing device, by capturing the object by a plurality of times while changing a capturing direction of the capturing device, the method comprises: deriving a corrected capturing range when at least one of lens aberration correction and perspective correction which are based on a position and the capturing direction of the capturing device with respect to the object is applied to an capturing range obtained upon capturing the object by the capturing device; and determining a plurality of capturing ranges which cover the entire region of the object so that two corrected capturing ranges corresponding to two adjacent capturing ranges, respectively, overlap each other.

According to the present invention having the foregoing configuration, the capturing directions in which a capturing device performs divided capturing of an object to capture different images can be set so that the overlapping regions between the captured images each have a size that is necessary and sufficient for their connection. This allows divided capturing with a minimum number of cuts for the object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described below with reference to the accompanying drawings. Note that the following embodiments do not limit the present invention according to the scope of claims, and not all combinations of features described in these embodiments are indispensable for solving means of the present invention.

First Embodiment

Apparatus Configuration

Figure 1:
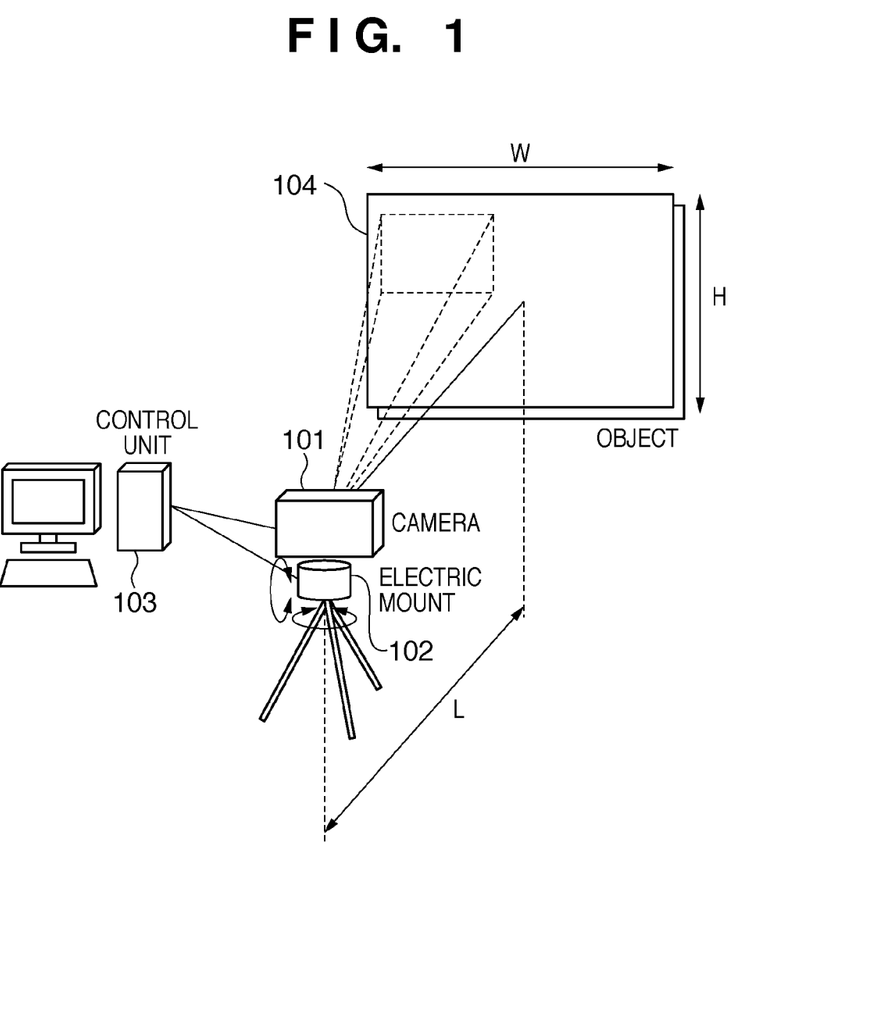
FIG. 1 is a view showing the configuration of a capturing system according to the first embodiment.

FIG. 1 is a view showing the configuration of a capturing system according to this embodiment. Referring to FIG. 1, reference numeral 101 denotes a camera as the main body of a capturing device in this embodiment; and 102, an electric mount. Upon being mounted on the electric mount 102, the camera 101 captures a target object while its body is panned and tilted by rotating the electric mount 102. Reference numeral 103 denotes a capturing control apparatus (to be referred to as a control unit hereinafter) which controls the operation of the camera 101 and the rotational operation of the electric mount 102. The control unit 103 also functions as an image processing apparatus which performs a connection process of captured images obtained by capturing an object by the camera 101 to generate an ultrahigh-resolution image. Reference numeral 104 denotes an object which is to be captured, has a width W and a height H, and is spaced apart from the camera 101 by a distance L.

Figure 2:
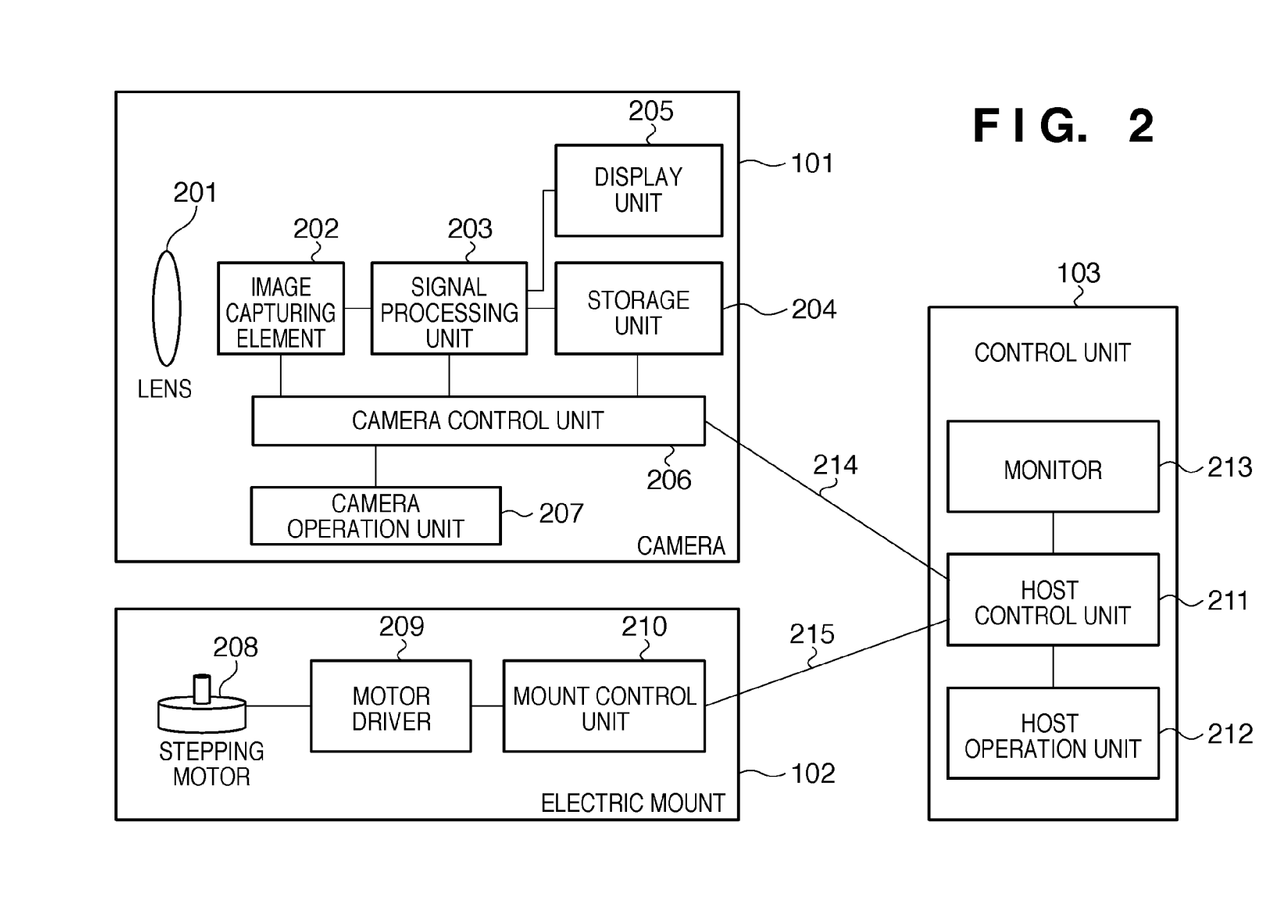
FIG. 2 is a block diagram showing the detailed configuration of the capturing system according to the first embodiment.

FIG. 2 shows the detailed configuration of the capturing system shown in FIG. 1. First, in the camera 101, reference numeral 201 denotes a capturing optical system lens; and 202, an image capturing element (for example, a CCD) which photoelectrically converts the formed optical image. Reference numeral 203 denotes a signal processing unit for performing a predetermined process of the sensed electrical signal; and 204, a storage unit for storing an image having undergone the signal processing. Reference numeral 205 denotes a display unit (for example, an LCD) for displaying the captured or stored image; 206, a camera control unit which controls the camera operation; and 207, a camera operation unit to which a user instruction is input. Next, in the electric mount 102, reference numeral 208 denotes a stepping motor for rotationally controlling the electric mount 102; 209, a motor driver; and 210, a mount control unit which controls the rotational operation of the stepping motor 208. Lastly, in the control unit 103, reference numeral 211 denotes a host control unit (host computer). Reference numeral 212 denotes a host operation unit to which a capturing instruction to the camera 101 and a user instruction to designate the rotation angle of the electric mount 102 are input; and 213, a monitor for displaying information in the host control unit 211. Reference numeral 214 denotes a communication line which connects the camera 101 and the control unit 103 to each other; and 215, a communication line which connects the electric mount 102 and the control unit 103 to each other. The operations of these devices are controlled by sending control signals from the control unit 103 to the camera 101 and electric mount 102 via the communication lines 214 and 215, respectively. Note that the communication lines 214 and 215 may be wired or wireless.

In the camera 101, an optical image formed on the image capturing element 202 by the capturing optical system lens 201 undergoes signal processing by the signal processing unit 203, and is displayed on the display unit 205. When shutter operation is performed by the camera operation unit 207 or a shutter command is sent from the host control unit 211, the camera control unit 206 stores the currently captured image in the storage unit 204. Also, when a rotational operation command is sent from the host control unit 211, the mount control unit 210 rotates in accordance with this command.

In this embodiment, for the sake of descriptive simplicity, assume that the object 104 has no distortion and is placed perpendicularly to the ground surface. Assume also that the camera 101 and the object 104 straightly face each other at the position (home position) where the electric mount 102 has zero pan and tilt angles, and the center of the angle of view of the camera 101 matches the center of the object 104 at this time.

Image Connection Process

In this embodiment, capturing (divided capturing) of an object that falls outside the angle of view of a capturing lens of the camera 101 is performed by a plurality of times while changing the capturing direction of the camera 101 to obtain a plurality of captured images which record the entire object all together. At this time, the electric mount 102 is controlled so that all captured images overlap adjacent captured images.

Prior to this divided capturing, the capturing direction is determined first. In this embodiment, the capturing direction of the camera 101 will be referred to as the "capturing coordinate position" hereinafter, and the capturing coordinate position is expressed by the pan and tilt angles of the electric mount 102. Next, capturing is performed at the determined capturing coordinate positions to obtain captured images. Lastly, all captured images are connected to generate a high-resolution image of the entire object. These processes will be described in detail below.

An overview of a connection process in this embodiment will be described first with reference to FIGS. 3A and 3B. In this embodiment, for the sake of descriptive simplicity, assume that the object can be approximated by a plane like a picture, and a plane which approximates the object will be referred to as an object plane. An object at a very large capturing distance, such as a landscape, can be directly treated as a plane, so the method according to this embodiment can be directly employed. Also, when the object shape is known in advance, the method according to this embodiment can be employed upon forming an object plane conforming to this shape.

Figure 3A:
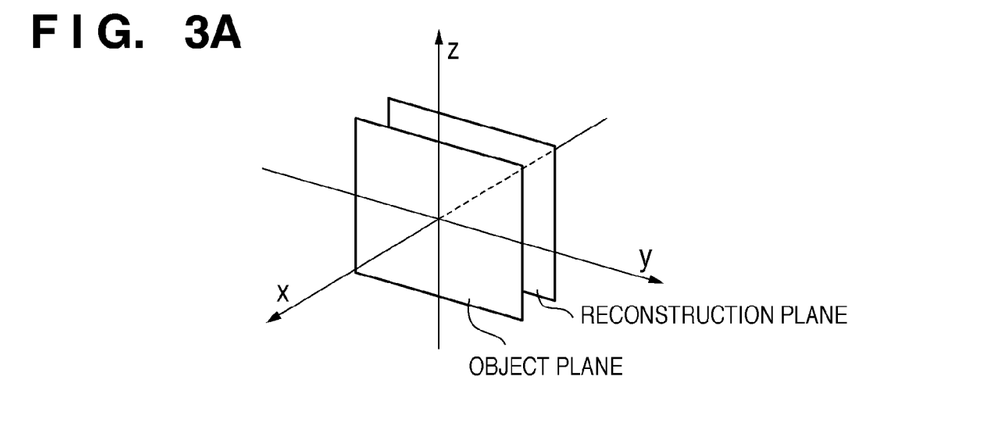
FIGS. 3A and 3B are views showing an overview of an image connection process in the first embodiment.

If the object is a plane, an object plane obtained by assuming the object on a given three-dimensional space (on a virtual space) is set, and captured images are mapped on the object plane, thereby placing the images, as shown in FIG. 3A. Referring to FIG. 3A, a reconstruction plane that is a virtual plane parallel to the object plane is assumed on the three-dimensional space. Details of this mechanism will be described later, but the amount of shift upon connection is calculated by projecting the captured images on the object plane onto the reconstruction plane (onto the virtual plane) in this embodiment. The object plane and the reconstruction plane need not always be parallel to each other.

Figure 3B:
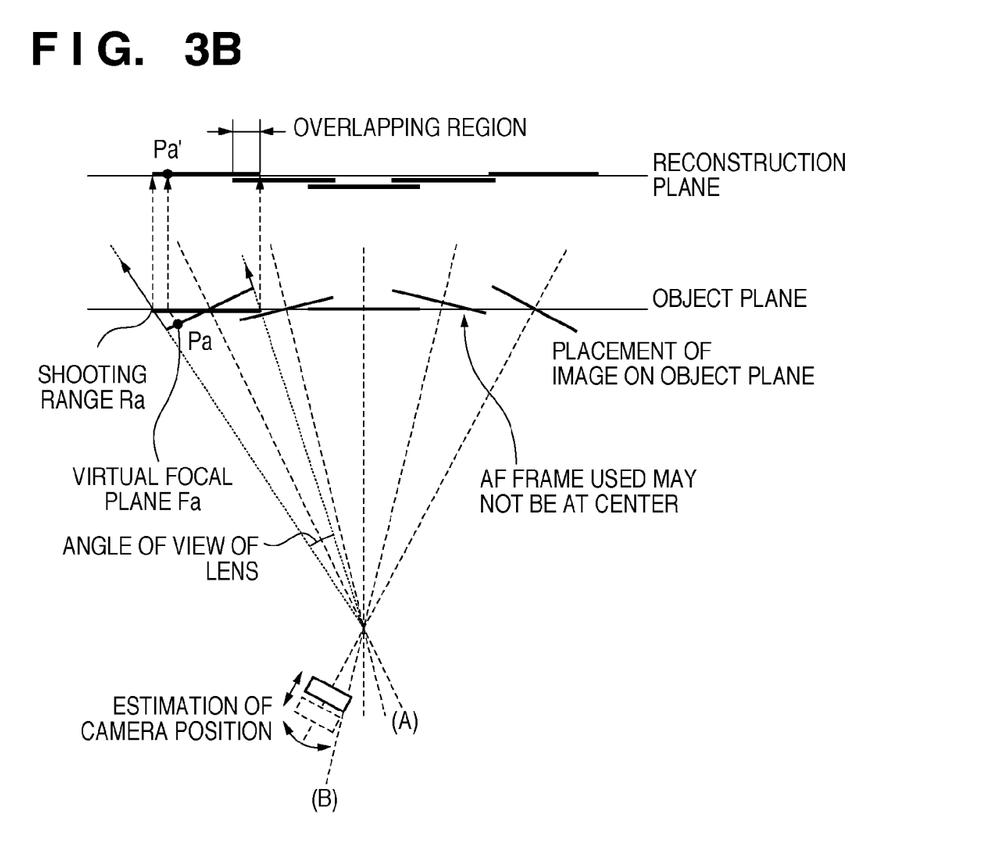

FIG. 3B is a view showing the three-dimensional space, shown in FIG. 3A, when viewed from the z-axis direction. Note that the angle that the captured image placed on the object plane makes with the object plane is determined depending on the camera position in capturing. The principle of the connection process in this embodiment will be described below with reference to FIG. 3B. When the camera captures the object at a position indicated by, for example, (A) in FIG. 3B so as to focus on the viewfinder center, a virtual focal plane Fa can be set based on the angle of view of the capturing lens. The virtual focal plane Fa is a plane on which the camera focuses, and a region including the virtual focal plane Fa in a scene that appears when the object is seen from the camera position is recorded in the captured image. In this case, the camera at the position indicated by (A) does not straightly face the object plane, so a capturing range Ra in the object plane is recorded in practice.

Hence, in this embodiment, a so-called perspective correction process of obtaining an object image from an eyepoint which is at a position infinitely distant from the object and at which the line of sight direction straightly faces the reconstruction plane is performed for one image obtained by divided capturing, based on its capturing direction using the reconstruction plane. A captured image which is on the reconstruction plane and has undergone perspective correction in this way will be referred to as a projected image hereinafter. In this embodiment, a final connected image is obtained by arranging a plurality of projected images as mentioned above.

If, for example, no distortion due to factors associated with the lens is present for the sake of descriptive simplicity, the pixel value at a point Pa' on the reconstruction plane becomes equal to that at a point Pa on the object plane from the distance between the object and the camera at the position indicated by (A) and the angle of view of the lens in capturing. Since the captured data is digital bitmap data, the pixel value is calculated by interpolating neighboring pixels if the point Pa has non-integer coordinates. When an AF frame used in the camera is not at the center of the captured image such as when the camera is at a position indicated by (B) in FIG. 3B, the virtual focal plane Fa is set such that the AF frame is placed on the object.

Figure 4:
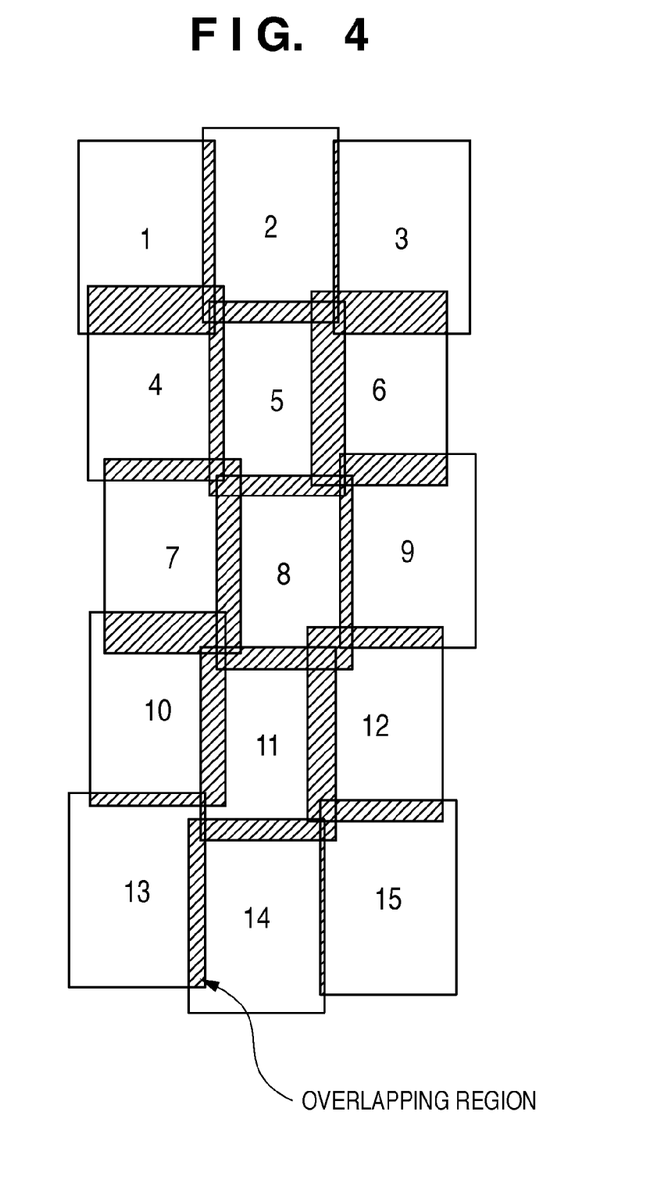
FIG. 4 is a view showing an example of projected images and their overlapping regions in the first embodiment.

FIG. 4 shows an example of projected images 1 to 15 obtained in the foregoing way. Although the projected images have overlapping regions, a connected image in which the captured images have smooth boundary portions among them, that give no sense of discomfort, can be obtained by performing a predetermined blend process for these regions.

Capturing Coordinate Position Determination Process

The size (amount of overlapping) of the above-mentioned overlapping region between the projected images is different from that of the overlapping region between the captured images on the object plane. This is because the projected images are obtained by applying lens aberration correction to the captured images and projecting the captured images for perspective correction, and therefore have sizes and shapes different from those of the original captured images. Hence, to obtain optimum overlapping regions between the projected images, that correspond to the details of a blend process, image deformation generated upon lens aberration correction and perspective correction must be taken into consideration.

The overlapping region between the projected images on the object plane, that is, their overlapping region in capturing must be adjusted to have a target size. This embodiment is characterized in that to meet the foregoing requirement, the size of the overlapping region between the projected images to which lens aberration correction and perspective correction are applied is calculated in advance, and the capturing coordinate position is determined such that the calculated size becomes a set value. A capturing coordinate position determination process in this embodiment will be described in detail below.

Figure 6:
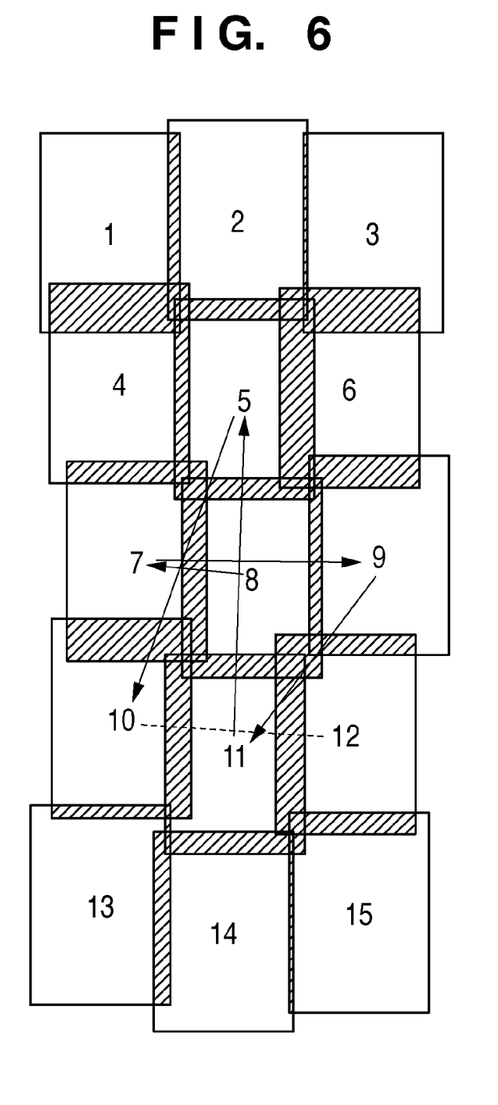
FIG. 6 is a view showing an example of the order of application of the capturing coordinate position determination process in the first embodiment.

In this embodiment, assuming an image captured at the home position of the electric mount 102 as a reference image, the capturing coordinate positions are determined for the remaining images in descending order of proximity to the reference image. FIG. 6 shows an example in which when image 8 is a reference image among projected images similar to those shown in FIG. 4, the remaining images are selected and processed in descending order of proximity of their centers to that of image 8. That is, the capturing coordinate positions are determined in the order of image 7, image 9, image 11, image 5, image 10, image 12, . . . with respect to reference image 8. As a matter of course, the capturing coordinate positions may be determined in another order, and a method of determining the capturing coordinate positions for image 2, image 3, image 4, image 5, . . . with reference to image 1 shown in FIG. 6 by raster scanning, for example, is possible. However, note that the capturing coordinate position must be determined for each image such that this image becomes adjacent to at least one of other images, regardless of the order of determination.

Figure 5:
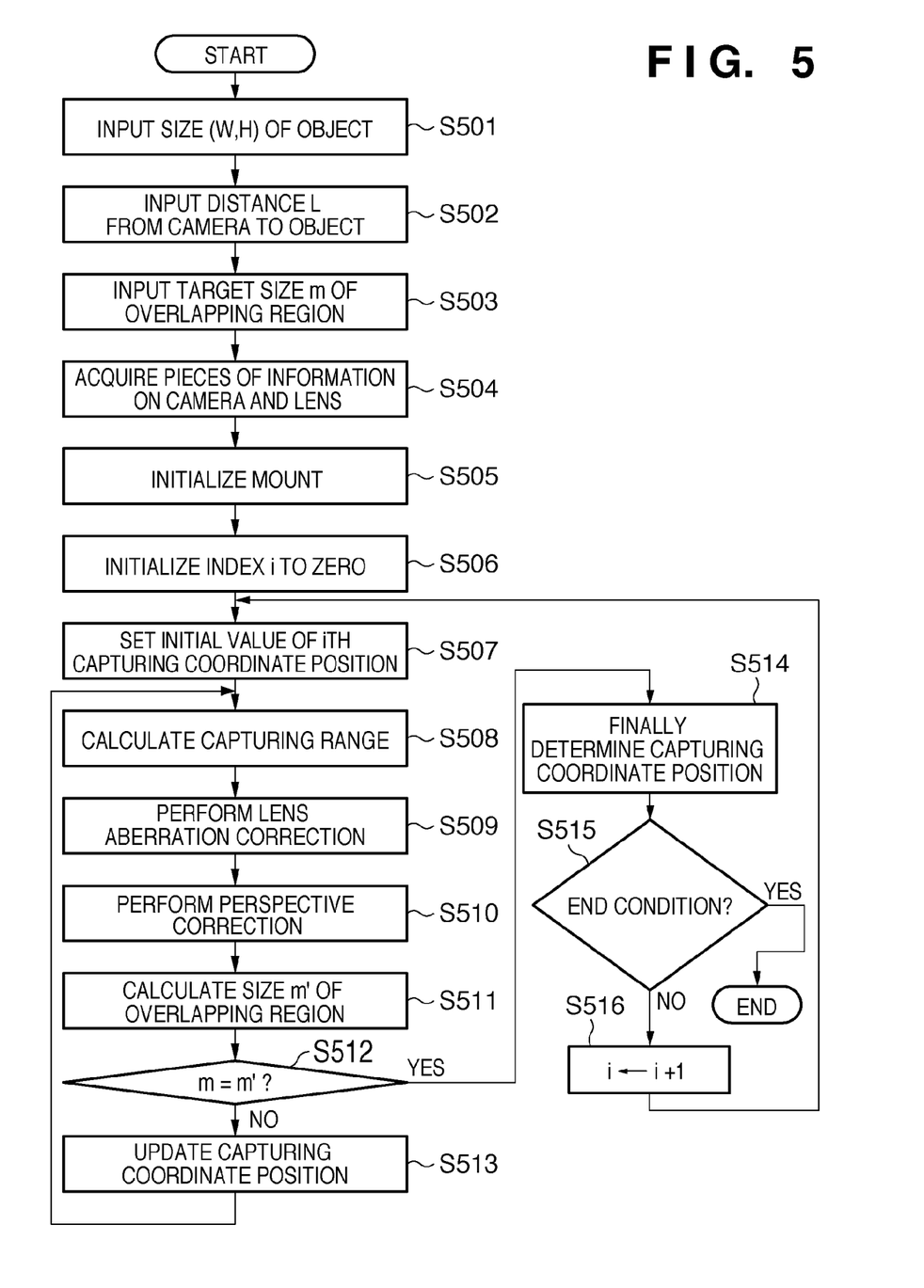
FIG. 5 is a flowchart showing a capturing coordinate position determination process in the first embodiment.

A capturing coordinate position determination process in this embodiment will be described in detail below with reference to a flowchart shown in FIG. 5. Although the capturing coordinate position determination process in this embodiment is controlled by executing a predetermined application in the host control unit 211 of the control unit 103, a hardware configuration which performs an equivalent process may be provided.

First, a width W and height H of the object 104 to be captured are input via the host operation unit 212 in step S501, and a distance L from the camera 101 to the object 104 is input via the host operation unit 212 in step S502. In step S503, a target size m of the overlapping region between projected images, that is necessary and sufficient for an image connection process, is input via the host operation unit 212. The target size m of the overlapping region, which is input at this time, is, for example, the number of pixels in this overlapping region or the ratio of this overlapping region to the image size, and is set in advance. Also, the target size m may be set to have a predetermined width. In step S504, various types of information such as the capturing distance and lens characteristics, which are set in advance in the camera 101 and lens 201, are acquired. The respective types of information acquired at this time are used in capturing range calculation and lens aberration correction (both will be described later).

In step S505, the electric mount 102 is moved to its home position, and the capturing coordinate position (reference capturing direction) for a reference image to be captured at the home position is determined. As described earlier, the capturing coordinate position is expressed by the pan and tilt angles of the electric mount 102, so the capturing coordinate position for the reference image is expressed by both zero pan and tilt angles of the electric mount 102. At this time, the capturing range (shape) of a projected image based on the capturing coordinate position for the reference image is obtained, as in steps S508 to S510 (to be described later). This is to optimize the capturing coordinate position for each projected image other than the reference image using the overlapping size between the capturing range for this projected image and that for a projected image, for which the capturing coordinate position has already been determined, in this process.

In steps S506 to S516, a loop process for determining the capturing coordinate position is performed for each of a plurality of captured images obtained by divided capturing of the object. An index i of the loop process is initialized to zero in step S506, and the initial value of the capturing coordinate position for the ith captured image of interest is set in step S507. As the initial value of the capturing coordinate position set at this time, an appropriate value can be set such that the captured image of interest has an overlapping region with images captured at the capturing coordinate positions which have already been determined. For example, the initial value of the capturing coordinate position for image 10 shown in FIG. 4 is set such that image 10 has overlapping regions with images 7 and 11. In this embodiment, because a final capturing coordinate position is determined by convergence operation for each captured image of interest, the initial value influences the convergence rate.

In step S508, the capturing range of the object obtained by the camera 101 when it is captured at the currently set capturing coordinate position is calculated based on the respective types of information: camera information, lens information, the distance L from the camera to the object, and the size (width W and height H) of the object. The capturing range calculated at this time will be referred to as a first capturing range hereinafter.

Figure 8:
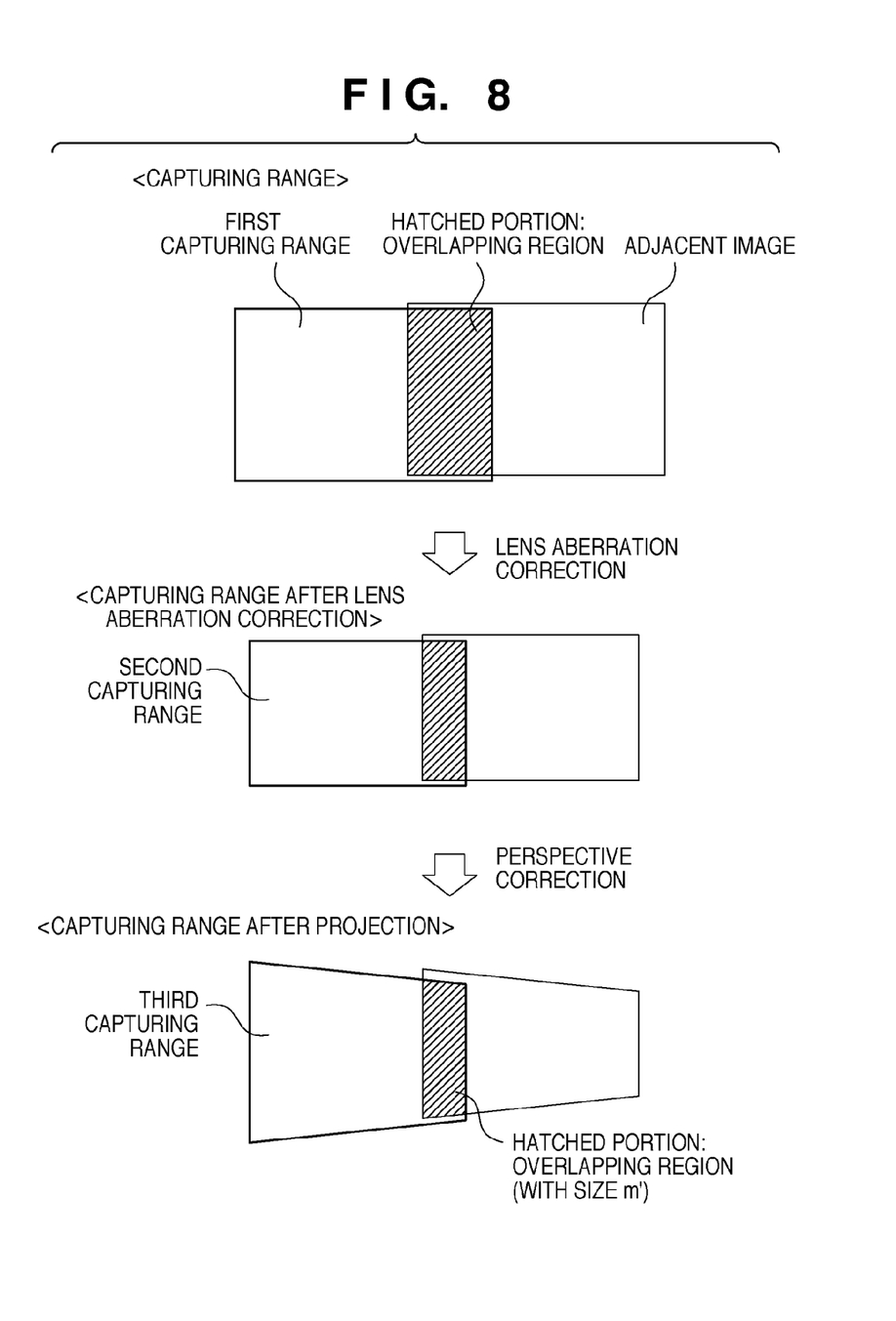
FIG. 8 is a view showing a change in overlapping region in the first embodiment.

FIG. 8 shows a change in overlapping region in this embodiment. With processes up to step S508, an <Capturing Range> shown in FIG. 8 is formed. That is, a first capturing range is calculated such that the image of interest has an overlapping region with adjacent images, that corresponds to the capturing coordinate position set in, for example, step S507.

In step S509, the characteristics in which the first capturing range calculated in step S508 changes upon applying lens aberration correction to the first capturing range are calculated, and a capturing range corresponding to the calculation result is defined as a second capturing range. In this embodiment, the characteristics in which an image captured at a representative capturing distance and capturing coordinate position deforms upon applying lens aberration correction based on various types of lens characteristics to it are calculated in advance, and the calculation result is held as a table indicating the amount of deformation after the aberration correction. Thus, in step S509, a second capturing range with respect to the first capturing range is calculated by looking up the table based on the pieces of information on the camera 101 and capturing optical system lens 201, which are acquired in step S504. With this process, an <Capturing Range after Lens Aberration Correction> shown in FIG. 8 is formed, and the size of the overlapping region in the captured image of interest has changed upon lens aberration correction from the first capturing range to the second capturing lens. This change results from the influence of especially distortion aberration, and the size of the image after aberration correction (capturing range) increases/decreases depending on the distortion shape such as a bobbin type or a barrel type.

In step S510, perspective correction corresponding to the set capturing coordinate position is applied to the second capturing range, updated in step S509, to update the second capturing range, thereby obtaining a third capturing range. This perspective correction is performed by looking up a table which holds, in advance, the amount of deformation after perspective correction for the image captured at the representative capturing distance and capturing coordinate position, like the above-mentioned lens aberration correction. The third capturing range (the capturing range after deformation) obtained at this time becomes the capturing range of the object, that corresponds to a projected image. With this process, an <Capturing Range after Projection> shown in FIG. 8 is formed, and the size and shape of the overlapping region has changed upon perspective correction from the second capturing range to the third capturing range.

In step S511, a size m' of the overlapping region between the third capturing range obtained in step S510 and a capturing range corresponding to a projected image of an adjacent image, for which the capturing coordinate position has already been determined, is calculated. The number of pixels in the overlapping region between the capturing ranges, for example, can be calculated as the size m', like the target size m.

In step S512, the target size m of the overlapping region set in step S503 and the size m' of the overlapping region calculated in step S511 are compared with each other. If m=m', the process advances to step S514, in which the capturing coordinate position set at that moment is finally determined as an optimum capturing coordinate position (optimum capturing direction) for the ith capturing range, the optimum capturing coordinate position is stored in a storage device (not shown) included in the host control unit 211, and the process advances to step S515. On the other hand, if m≠m', the process advances to step S513, in which the capturing coordinate position is updated and the process returns to step S508.

Note that in step S513, the capturing coordinate position is updated in the direction to decrease the amount of overlapping between the image of interest and an adjacent image if m<m', or is updated in the direction to increase the amount of overlapping between these two images if m>m'. In this manner, the number of times of repetition of the updating process can be reduced by adopting a search method such as a binary algorithm to the updating of the capturing coordinate position. Although decision as to whether m=m' has been exemplified in step S512, it may be decided that m is essentially equal to m' if their difference is equal to or smaller than a predetermined threshold. Also, if m is set to have a predetermined range, it can be decided whether m' falls within this range.

In step S515, it is decided as the end condition of this process whether the entire object 104 falls within the total capturing range based on the optimum capturing coordinate positions determined up to now. If the entire object 104 falls within this range, the process ends; otherwise, the process advances to step S516, in which the index i is incremented by 1, and thereafter the process returns to S507 in order to determine an optimum capturing coordinate position indicating the next capturing range.

Capturing Process

In this embodiment, capturing is performed based on the optimum capturing coordinate position determined by the above-mentioned capturing coordinate determination process. A capturing process in this embodiment will be described below with reference to a flowchart shown in FIG. 7.

Figure 7:
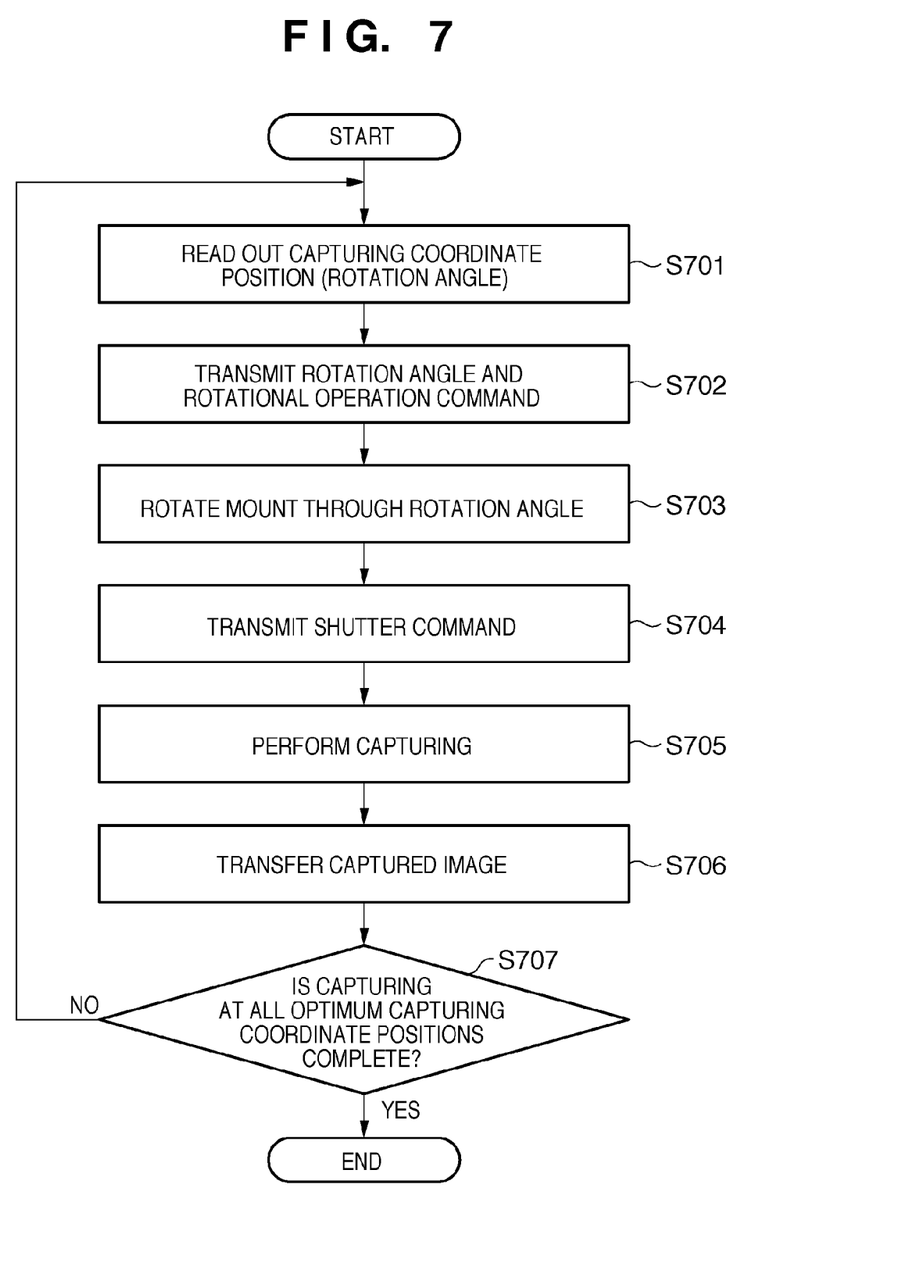
FIG. 7 is a flowchart showing a capturing process in the first embodiment.

First, in step S701, the host control unit 211 reads out one optimum capturing coordinate position (rotation angle) stored in a storage device (not shown). In step S702, the host control unit 211 transmits the electric mount rotation angle indicated by the optimum capturing coordinate position, together with a rotational operation command, to the mount control unit 210 via the communication line 215. In step S703, the mount control unit 210 causes the motor driver 209 to drive the stepping motor 208 to rotate the electric mount 102 through the received rotation angle. In step S704, the host control unit 211 transmits a shutter command to the camera control unit 206 via the communication line 214.

In step S705, in response to the shutter command, the camera control unit 206 releases the shutter of the camera 101 to perform capturing. An image captured at this time (a captured image of interest) is stored in the storage unit 204 in the camera 101. In step S706, the camera control unit 206 transfers the captured image of interest stored in the storage unit 204 to the storage device in the host control unit 211 via the communication line 214.

In step S707, it is determined whether capturing processes at all optimum capturing coordinate positions stored in the storage device of the host control unit 211 are complete. If the capturing processes are complete, the process directly ends; otherwise, the process returns to step S701, in which the capturing process at the next optimum capturing coordinate position continues.

As has been described above, according to this embodiment, when the captured image contains errors due to lens aberration and perspective distortion, and image deformation occurs upon image connection, the amount of image deformation upon lens aberration correction and perspective correction is calculated in advance. An overlapping region that is necessary and sufficient for an image connection process is calculated in accordance with the amount of deformation, and each capturing coordinate position is determined such that each captured image maintains the overlapping region at the time of connection. Thus, capturing is performed such that each projected image has an overlapping region that is necessary and sufficient for an image connection process, thereby making it possible to minimize the number of capturing cuts for the object.

Although an example in which a capturing coordinate position determination process and a capturing process are separately executed has been given in this embodiment, they may be executed in combination, that is, a capturing process may be executed while determining the capturing coordinate position. Also, although an example in which all captured images have overlapping regions with the same size has been given, not all the overlapping regions need to have the same size, and the overlapping regions may have sizes which vary depending on, for example, the capturing position of the object.

Second Embodiment

The second embodiment according to the second embodiment will be described below. A method of determining the capturing coordinate position such that each projected image has an overlapping region that is necessary and sufficient for an image connection process when a corresponding captured image contains errors due to lens aberration and perspective distortion has been described in the first embodiment. A method of determining the capturing coordinate position by additionally taking account of deterioration in image quality upon lens aberration correction and perspective correction will be described in the second embodiment.

In general, upon lens aberration correction, the image quality deteriorates more seriously on the peripheral portion of a corrected image than at its central portion. Also, upon perspective correction, a corrected image is generated by an interpolation process for an image to be corrected, so the influence of the interpolation process gets more significant in a direction away from the center of the image to be corrected, and the image quality deteriorates as well. Examples of the image quality include herein the sharpness and the tone characteristics. The second embodiment is characterized in that to take account of such deterioration in image quality, effective regions that satisfy a predetermined image quality within the capturing range are extracted, and the capturing coordinate position is determined based on overlapping between the effective regions.

Capturing Coordinate Position Determination Process

Figure 9:
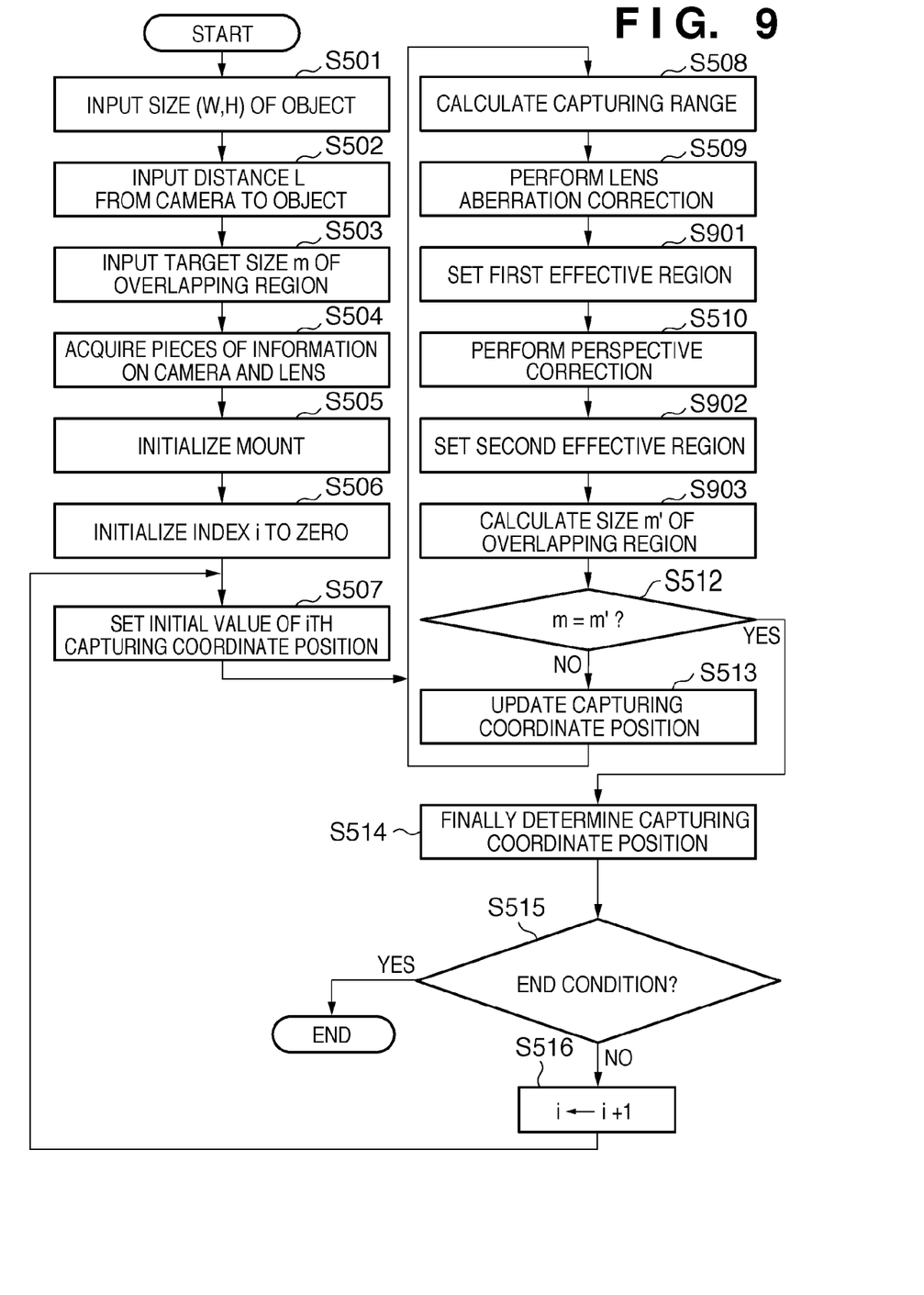
FIG. 9 is a flowchart showing a capturing coordinate position determination process in the second embodiment.

A capturing coordinate position determination process in the second embodiment will be described in detail below with reference to a flowchart shown in FIG. 9. Note that the flowchart shown in FIG. 9 is obtained by adding steps S901, S902, and S903 to the flowchart shown in FIG. 5 in the above-described first embodiment. Hence, a description of processes in FIG. 9 common to those in FIG. 5 will not be given.

In step S901, a region that satisfies a specific image quality is extracted from the second capturing range after lens aberration correction, which is obtained in step S509, as a first effective region. For example, the degree of deterioration in image quality corresponding to the position in the image is obtained in advance from the lens characteristic values, and a region with a degree of deterioration that is less than a predetermined value is determined as a first effective region.

Figure 10:
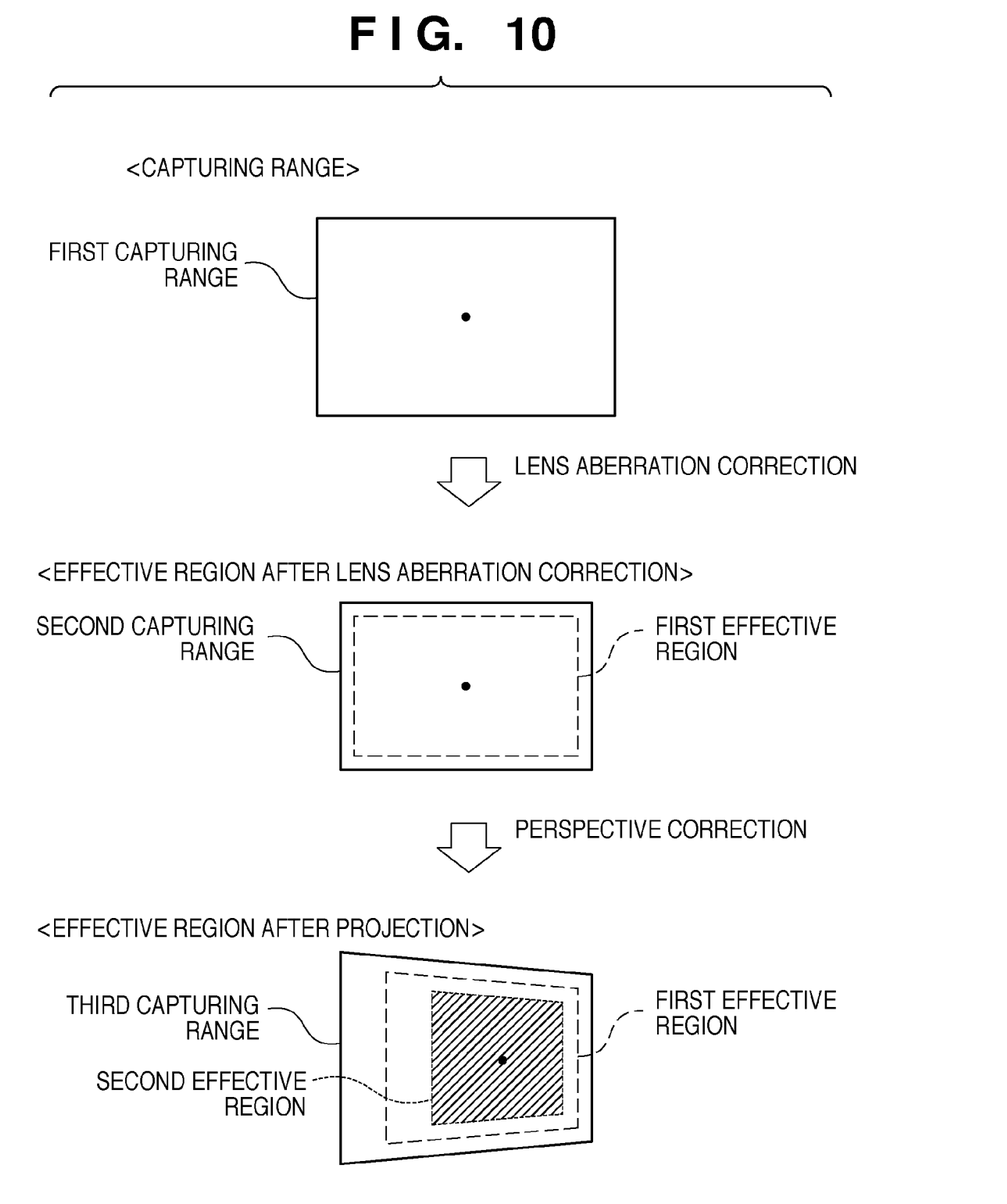
FIG. 10 is a view showing the relationship between the capturing range and the effective region in the second embodiment.

FIG. 10 shows the relationship between the capturing range and the effective region in the second embodiment. With a process in step S901, an <Effective Region after Lens Aberration Correction> shown in FIG. 10 is formed, and a first effective region is extracted from the second capturing range by excluding a portion that has seriously deteriorated upon lens aberration correction.

In step S902, a region that satisfies a specific image quality is extracted from the third capturing range after perspective correction, which is obtained in step S510, as a second effective region. For example, a region at a distance from the position corresponding to the center of the captured image, that is equal to or smaller than a predetermined value, is determined as a second effective region. With this process, an <Effective Region after Projection> shown in FIG. 10 is formed, and the second effective region is extracted from the first effective region having undergone perspective correction.

In step S903, a size m' of the overlapping portion between the second effective region extracted in step S902 and that in an adjacent image, for which the capturing coordinate position has already been determined, is calculated.

In the second embodiment, as well as the above-described first embodiment, capturing is performed based on the optimum capturing coordinate position determined by the foregoing capturing coordinate position determination process, and all images captured by the capturing are connected to each other, thereby generating one high-resolution image. Note that only the second effective region is used as a projected image in the second embodiment. This makes it possible to obtain a connected image that satisfies a predetermined image quality.

As has been described above, according to the second embodiment, the capturing coordinate position can be determined for each captured image such that the connected image satisfies a predetermined image quality, in addition to the effect of the above-described first embodiment. This makes it possible to keep the number of capturing cuts to the minimum necessary while assuring a predetermined image quality.

Third Embodiment

Although the accuracy of attaching a camera to an electric mount is not particularly referred to in the above-described first and second embodiments, the capturing coordinate position may be determined by additionally taking account of errors upon camera attachment. In attaching the camera to the electric mount, the camera is ideally, horizontally placed at the home position of the mount. However, in practice, a captured image may contain errors in which, for example, the camera is attached while being slightly rotated due to the influence of the camera attachment accuracy. To combat this situation, the capturing coordinate position may be determined by providing a gyro and an accelerometer to the camera in advance, and calculating the overlapping region with an adjacent image using the orientation information of the camera on the electric mount, which is obtained by these measuring instruments. Also, if no sensor, for example, can be used, the capturing coordinate position may be determined by obtaining, in advance, information on the amount of error, with which the camera is placed, so that an overlapping region with the set or minimum size can be maintained even if that error has occurred.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298825, filed Dec. 28, 2009, which is hereby incorporated by reference herein in its entirety.

What is claimed is:

1. A control apparatus which controls a capturing device so as to obtain a plurality of captured images including an entire region of an object, which has an angle of view wider than an angle of view of an optical system of the capturing device, by capturing the object by a plurality of times while changing a capturing direction of the capturing device, the apparatus comprising:

a derivation unit configured to derive a corrected capturing range wherein at least one of lens aberration correction and perspective correction, which are based on a position and the capturing direction of the capturing device with respect to the object, is applied to a capturing range obtained upon capturing the object by the capturing device; and a determination unit configured to determine a plurality of capturing ranges which cover the entire region of the object so that two corrected capturing ranges corresponding to two adjacent capturing ranges, respectively, overlap each other.

2. The apparatus according to claim 1, further comprising a control unit configured to control the capturing device and an electric mount which mounts the capturing device so as to capture the plurality of captured images based on the plurality of capturing ranges determined by said determination unit.

3. The apparatus according to claim 1, further comprising an input unit configured to receive an input of an overlapping size between the two corrected capturing ranges.

4. The apparatus according to claim 2, wherein said determination unit calculates an overlapping size between the two corrected capturing ranges using orientation information obtained from the electric mount.

5. The apparatus according to claim 1, further comprising a connection unit configured to connect the plurality of captured images to generate one image including the entire region of the object.

6. A control method of controlling a capturing device so as to obtain a plurality of captured images including an entire region of an object, which has an angle of view wider than an angle of view of an optical system of the capturing device, by capturing the object by a plurality of times while changing a capturing direction of the capturing device, the method comprising:

deriving a corrected capturing range wherein at least one of lens aberration correction and perspective correction, which are based on a position and the capturing direction of the capturing device with respect to the object, is applied to a capturing range obtained upon capturing the object by the capturing device; and determining a plurality of capturing ranges which cover the entire region of the object so that two corrected capturing ranges corresponding to two adjacent capturing ranges, respectively, overlap each other.

7. A non-transitory computer-readable storage medium storing a computer program, the computer program causing a computer to execute each step of a control method defined in claim 6.

* * * * *